(12) United States Patent
Penocchio et al.

(10) Patent No.: US 8,863,818 B2
(45) Date of Patent: Oct. 21, 2014

(54) INTEGRATED PRE-HEATING AND COOLING SYSTEM FOR DIES

(75) Inventors: Camillo Penocchio, Calcinato (IT); Paolo Bonvicini, Calcinato (IT)

(73) Assignee: Industrial Frigo, S.R.L., Calcinatio (BS) (IT)

( * ) Notice: Subject to any disclaimer, the term of this patent is extended or adjusted under 35 U.S.C. 154(b) by 0 days.

(21) Appl. No.: 13/988,008

(22) PCT Filed: Nov. 23, 2011

(86) PCT No.: PCT/IB2011/055248
§ 371 (c)(1),
(2), (4) Date: May 16, 2013

(87) PCT Pub. No.: WO2012/069998
PCT Pub. Date: May 31, 2012

(65) Prior Publication Data
US 2013/0233504 A1    Sep. 12, 2013

(30) Foreign Application Priority Data

Nov. 24, 2010 (IT) .............................. BS2010A0190

(51) Int. Cl.
| B22C 9/06 | (2006.01) |
| B22D 17/22 | (2006.01) |
| B29C 35/00 | (2006.01) |
| B29C 45/73 | (2006.01) |

(52) U.S. Cl.
CPC ............ B22C 9/065 (2013.01); B22D 17/2218 (2013.01); B29C 35/007 (2013.01); B29C 45/73 (2013.01)
USPC ....................................... 164/348; 164/338.1

(58) Field of Classification Search
CPC .... B22C 9/065; B22D 17/2218; B22D 27/04; B29C 45/73
USPC ............ 164/338.1, 348; 264/328.16; 425/547
See application file for complete search history.

(56) References Cited

U.S. PATENT DOCUMENTS 5,285,841 A * 2/1994 Yamauchi et al. ............ 164/348
6,827,323 B2 * 12/2004 Minemoto ....................... 249/79
7,323,127 B2 * 1/2008 Muranaka et al. ........... 264/40.6

FOREIGN PATENT DOCUMENTS

| EP | 0555976 A1 | 8/1993 |
| EP | 1563975 A2 | 8/2005 |
| IT | 1368475 B * | 12/2009 |
| JP | 03180263 A * | 8/1991 |
| JP | H07229293 A | 8/1995 |

OTHER PUBLICATIONS

PTO translation of IT 1368475 B, Apr. 2014.*

* cited by examiner

Primary Examiner — Keith Walker
Assistant Examiner — Kevin E Yoon
(74) Attorney, Agent, or Firm — Volpe and Koenig, P.C.

(57) ABSTRACT

The invention concerns a system for the thermoregulation of dies for die-casting, dies for chill casting and the like. It comprises a tank (11) containing a cooling fluid; a primary hydraulic circuit (12) for a circulation of the cooling fluid from the tank to the die to be cooled and from this to the tank through a heat exchanger (SC); a secondary pneumatic circuit (13) connected to the primary hydraulic circuit (12) for the circulation of an aeriform fluid in the die to be cooled both in alternative, and in a mixed form with the liquid cooling fluid; and a pre-heating hydraulic circuit (112) integrated with the primary hydraulic circuit (12) and assigned to the production and circulation of a hot liquid fluid for pre-heating the die to be thermoregulated.

8 Claims, 1 Drawing Sheet

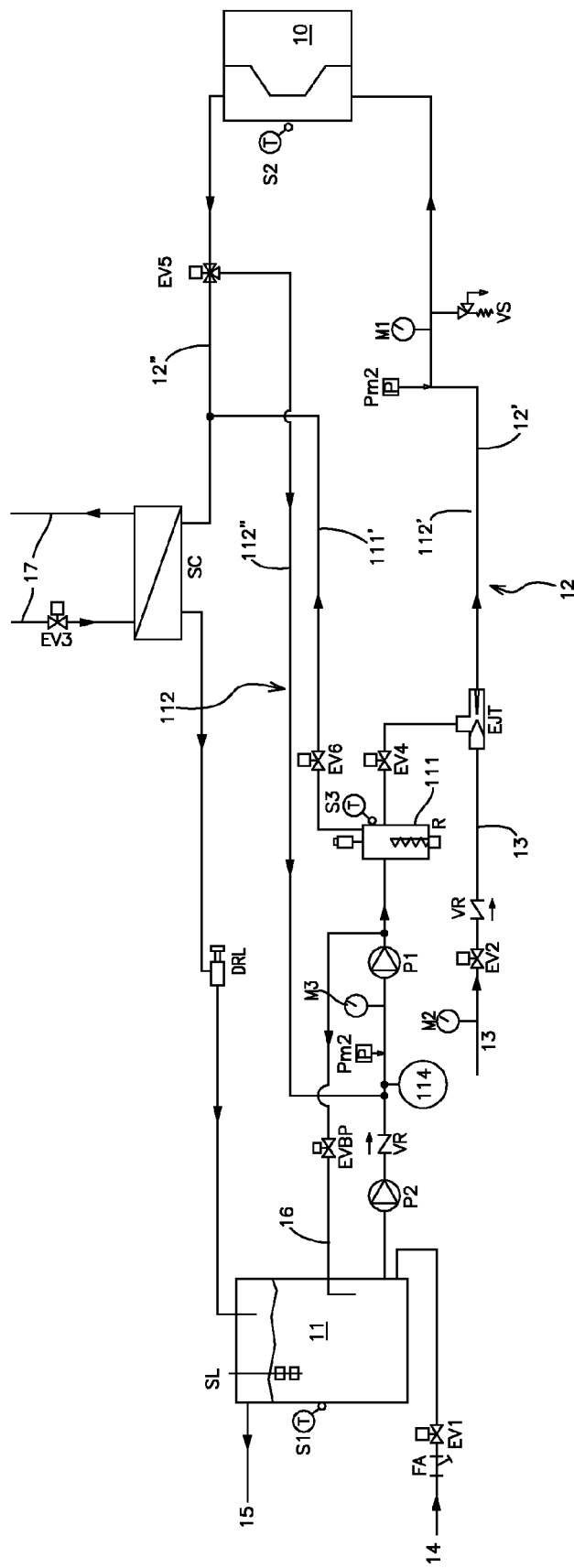

INTEGRATED PRE-HEATING AND COOLING SYSTEM FOR DIES

FIELD OF THE INVENTION

The present invention is directed to a system for the thermoregulation of devices in industrial process plants operating at high temperatures, particularly dies for die-casting, dies for chill casting and the like.

STATE OF THE ART

The afore said dies may also work at higher temperatures, for example about 350° C. and higher. For their correct use in the die forming process field, they have to be thermoregulated, at least by cooling them where their temperature tends to extreme and inadmissible values.

Usually, the cooling is carried out by means of a heat-transfer fluid, such as water or diathermic oil, coming from a tank and circulated in ducts obtained in the die and subsequently in a heat exchanger to be cooled in its turn before its return to the tank.

According to main art, the cooling fluid, in case of water, is contained in a pressurized tank and it is circulated in a high-pressurized closed circuit of about 169 Bar at 350° C., for example, the latter entailing relevant structural problems about sealing and safety of the circuit itself.

In a previous Patent IT 1 368 475 of the same Applicant, it is described and claimed a system for the thermoregulation of dies for die-casting, dies for chill casting and the like, comprising an open tank containing a liquid cooling fluid, particularly water, a primary hydraulic circuit for a circulation of said liquid fluid from said tank to the die to be thermoregulated and from the latter to the tank through a heat exchanger. The primary circuit is integrated with the secondary circuit intended for the circulation of a gaseous fluid, typically air, in the die to be conditioned both in alternative and in a mixed form with the liquid fluid, and with a unit for controlling and operating the primary hydraulic circuit and the secondary pneumatic circuit for the system operation and for thermoregulating the die with the only liquid fluid, with the only gaseous fluid or the gaseous fluid mixed with the liquid fluid.

This system is workable and reliable, advantageously allowing the circulation of the liquid heat-transfer fluid with pressure levels relatively low, but it is only suited for cooling the dies.

However, in the practice it is sometimes required and convenient, to better operate and accelerate the start of the die forming process, also a pre-heating of the dies at a temperature of 140-160° C., for example, anyway lower than the real working temperature of the same dies.

The pre-heating may be carried out with the liquid fluid returning from a die and collected in the system tank after its passage through the heat exchanger, but the fluid temperature in the tank, usually in the range of 90-100° C., is not in itself sufficient for an appropriate die heating. On the other hand the die pre-heating with a liquid fluid heated up to the desired temperature in the same tank of the thermoregulating system, or in another additional tank, if not in pressurized conditions, may lead to the undesired vapor formation, thermal loss and energy consumption.

OBJECTS AND SUMMARY OF THE INVENTION

The present invention has been designed to satisfy this need too and, as a matter of fact, it is its main object to establish the conditions, in addition to for the die cooling with a liquid and/or gaseous fluid at relatively low pressures, also for the pre-heating of the dies themselves up to a desired temperature from time to time.

A further object of the invention is then to provide a system for the thermoregulation of dies in which a cooling circuit and a heating circuit are combined and integrated, particularly in dies for die-casting, dies for chill casting and the like, operating with relatively high temperatures.

These objected are reached, according to the invention, by a thermoregulation system according to the preamble of claim 1 and characterized in that the system further integrates means to pre-heat the water and a hydraulic circuit to pre-heat the die or chill with the hot water coming from said means.

Advantages of an integrated pre-heating and cooling system for dies, further to those related in the afore said Patent IT 1 368 475 concerning the possibility of water and air use, both separately and together, the safety, the cleanness and the ecological and economical aspects, are evidently of being able to use an open storage tank of heat-transfer fluid, that is at atmospheric pressure, and to carry and use the same fluid for two modes: pre-heating and cooling, alternatively, in the same plant, but with the fluid intended for the pre-heating having the possibility of being generated under pressure out of the storage tank to obviate to the vapor formation at the required temperatures in the die pre-heating.

BRIEF DESCRIPTION OF THE DRAWING

Further details of the invention will be evident by following description made with reference to the attached drawing in which the only FIGURE shows a general scheme of the system.

DETAILED DESCRIPTION OF THE INVENTION

Therefore and as it is represented the system for the thermo-regulation of a die or chill 10 comprises essentially an open storage tank 11, a primary hydraulic circuit 12, a secondary pneumatic circuit 13 and an auxiliary pre-heating circuit 112 connected to the primary hydraulic circuit.

The storage tank 11 has a volume of heat-transfer fluid, preferably water loaded therein and then filled up if necessary through a supply line 14 having a filter FA and a loading solenoid valve EV1. The fluid level in the tank 11 is controlled by a level sensor SL and overflow device 15.

The primary hydraulic circuit 12 has a delivery line 12' from the tank to the die 10 and a return line 12" from the die to the tank, whereas the pneumatic circuit 13 is connected to the delivery line 12' of the primary circuit by means of an ejector EJT.

Along the delivery line 12' at least a recirculation pump P1 and, downstream this but upstream the ejector EJT, a solenoid valve EV4 with adjustable opening and, downstream said ejector, a delivery pressure switch Pm1, to operate the minimum pressure in the same line 12', a manometer M1 and a safety valve VS are inserted. In the length between the recirculation pump P1 and the solenoid valve EV4, the delivery line 12' is reconnected to the storage tank 11 through the bypass line 16 having an on/off valve EVBP.

The return line 12" passes through at least one heat exchanger SC and it may be provided with a possible pressure switch to operate the minimum return pressure and with a regulation metering valve DRL. In its turn the heat exchanger SC is fed with a cooling fluid through inlet and outlet lines 17 under the control of a solenoid valve EV5 on the inlet line.

The pneumatic circuit 13 is provided for the circulation of a aeriform fluid, typically air, and it is connected to the delivery line 12' of the hydraulic circuit 12 through the ejector EJT and it comprises at least one manometer M2, an inlet solenoid valve EV2 and a non-return valve VR1.

The hydraulic pre-heating circuit 112 of the die is substantially ring-shaped in its inside and it is integrated with the so far described system. According to the invention, on the return line 12" of the primary circuit 12 a three-way solenoid valve EV5 is inserted, and the pre-heating circuit 112 comprises a delivery line 112' towards the die, preferably in common and coincident with the same delivery line 12' of the primary hydraulic circuit 12, and a return line 112" extending from an outlet of said three-way valve EV5 until it joins with the delivery line 12', 112' common with the primary 12 and the pre-heating 112 circuits, in a part upstream the recirculation pump P1.

Further, on the common line 12', 112' of the two primary and pre-heating circuits 12, 112 a second tank 111 is inserted, the latter containing water too and being provided with an electric resistor R to heat and maintain the temperature of the liquid herein contained.

In the represented example, such a second tank 111 is positioned downstream the recirculation pump P1, between the latter and the ejector EJT. It is further provided with a thermal probe S3 to detect the water temperature in its inside and with a vent line 111' with a vent solenoid valve EV6, connecting it to the return line 12' of the primary hydraulic circuit downstream the three-way solenoid valve EV5, that is downstream the heat exchanger SC.

To supply and circulate the pre-heating water from the second tank 111 towards the die 10 and from the latter to the same second tank a second pump P2, or pressurization pump, may be provided, which is inserted on the delivery line 12', in the represented example, from the storage tank 11 to the die 10. Alternatively the circulation of the pre-heating fluid in the pre-heating circuit 112 may be realized by the same recirculation pump P1, conveniently positioned and activated, of the cooling fluid.

The plant may be further comprise a temperature probe: S1 of the water in the storage tank, a temperature probe S2 at the die 10, as well as a non-return valve VR2, an expansion vessel 114, a pressure switch Pm2 and a manometer M3 on the line of the second pump P2.

The system of the invention may operate according to three different modes:

1. to alternatively cool the die with high pressurized air/water (up to about 14 Bar);
2. to cool the die with air mixed with water at low pressure (about 1-2 Bar);
3. to pre-heat the die with hot pressurized water all controlled by an electronic device (PLC) programmed to manage the readings coming from the number of controlling instruments and the instruments for opening and closing the solenoid valves.

Instead the opening/closing of the valves VBP and DRL on the primary circuit may be carried out manually.

In the first working mode, the water that is withdrawn from the storage tank and circulated in the primary circuit 12 by the recirculation pump 12 represents the main cooling fluid. The system has areas with different pressures and temperatures allowing anyway the cooling water not to ever evaporate. On the other hand, the air could then be used both for adjusting the water temperature, in case of insufficient cooling of the die, and as cooling emergency fluid, with security functions in response to different alarms and/or failures of the recirculation pump P1 or other components of the primary hydraulic circuit 12.

When the cooling system is started, the recirculation pump P1 is stopped, the inlet solenoid valve EV2 of the pneumatic circuit 13 is open to admit air into the hydraulic circuit 12 and the solenoid valve EV1 opens to fill water into the vessel/tank 11 under the control of a level sensor SL. After a predetermined time, and if the pressure and temperature parameters in the system are within given thresholds, the solenoid valve EV2 closes and the pump P1 starts, thereby activating the water cooling of the die or chill 10. During the cooling, the water in the tank 11 maintains a temperature lower than 90° C., the pressure in the delivery line 12' of the primary hydraulic circuit 12 is relatively high, the water enters into the die or chill 10 and it comes out heated at a temperature of about 180-200° C., and then it comes back to said tank after it has passed through the heat exchanger, in which it is cooled and taken back to a temperature of 90° C.

The water remains pressurized until the metering valve DRL, adjusted and operating to assure a minimum passage of water, to maintain the desired pressure in the hydraulic circuit upstream the valve itself, and to lower the water pressure from the side of its exit towards the vessel or tank.

The secondary pneumatic circuit 13 starts operating automatically when controls, alarms or failures in the hydraulic circuit ask for, anyway under the control of the programmed electronic device (PLC) and programmable according to requirements.

During the air cooling, the pump P1 is stopped and the valve EV2 is open, the air arrives to the delivery line 12' through the ejector EJT and it runs through the circuit in the same direction of the cooling water, flushing out the pipes from the water itself and determining a die cooling until when the conditions allowing a correct water cooling are restored.

With the second working mode, the circuit pressure remains almost constant as time goes by, depending on the air pressure. The working pressure is then relatively low, 1-2 Bar, as afore said.

Then the main cooling fluid is become the air which, through the ejector EJT, is mixed with water in the desired and determined quantity by means of the solenoid valve EV4 driven by the operating electronic device.

As a result of a local and/or remote signal of cooling start, then there are two possibilities.

a. The die cooling only with air, for which the solenoid valve EV2 opens for entering air, the pump P1 starts, the valve VBP on the bypass line 16 is opened, whereas the solenoid valve EV4 on the delivery line 12' is closed for the return of water into the tank; then an air flow runs through the circuit, entering from the ejector EJT then to circulate in the die and exit into the tank.

b. The die cooling with air mixed with water, for which the pump P1 is started, if not started yet, and the solenoid valve EV2 for entering air is open as the valve BHP is open on the bypass line 16. In the same time an electronic control (PLC) operates the opening of the solenoid valve EV4 to measure out the correct quantity of water to be circulated with the air entering from the ejector EJT.

In the pre-heating mode of the die or chill 10, the water contained into the second tank 111, preventively loaded with water that may come from the storage tank 111, is used.

Then the recirculation pump P1 is still inactive, the solenoid valve EV4 on the delivery line 12' of the primary hydraulic circuit 12 is open and the three-way solenoid valve EV5 on the line 12" returning from the die or chill is switched so that such a valve is closed at the side connected with the exchanger and it is open at the side connected with the return line 112" of the pre-heating circuit 112.

In these conditions, the water may be heated in the second tank 111 by the electric resistor and then it is supplied by the pump P2 towards the die or chill 10 for its pre-heating, for example to a temperature of 140-160° C. The water exiting from the die passes through the three-way solenoid valve EV5 for its return to the second tank 111 through the return line 112" of the pre-heating circuit 112.

Then the controlling electronic device, both independently, and interacting with outer interfaces, will be programmed to operate the subsequent steps:
- switched on system, but inactive for cooling the die as it is supplying neither air nor water;
- cooling of the die only with air;
- cooling the die with air mixed with water in different required modulations;
- pre-heating of the die with hot water coming from a second tank provided with a heater.

The invention claimed is:

1. A system, for the thermoregulation of a die, comprising an open tank (11) containing a liquid cooling fluid,
a primary hydraulic circuit (12) for a circulation of said liquid cooling fluid from said open tank to the die and from the die to the open tank through a heat exchanger (SC),
a secondary pneumatic circuit (13) connected to the primary hydraulic circuit (12) and provided for the circulation of an aeriform fluid in the die to be cooled both in alternative, and in a mixed form with the liquid cooling fluid, and
a control unit of the primary hydraulic circuit (12) and of the secondary pneumatic circuit (13) to operate the cooling of the die with only the liquid cooling fluid, with only the aeriform fluid or with the aeriform fluid mixed with liquid fluid, further comprising a pre-heating hydraulic circuit (112) integrated with the primary hydraulic circuit (12) and assigned to the production and circulation of a hot liquid fluid for pre-heating the die.

2. A system according to claim 1, wherein
the primary hydraulic circuit (12) comprises at least a recirculation pump (P1) for the circulation of the liquid cooling fluid, a delivery line (12') from the open tank (11) to the die and a return line (12") from the die to the open tank through the heat exchanger for cooling said fluid,
the secondary pneumatic circuit (13) is connected to the delivery line (12') of said primary hydraulic circuit (12) by means of an ejector (EJT) positioned downstream of said circulation pump and of a non-return valve, and
the pre-heating hydraulic circuit (112) comprises
a three-way solenoid valve (EV5) on the return line (12") of the primary hydraulic circuit (12), downstream of said heat exchanger (SC),
a second tank (111) containing preheating liquid fluid and provided with a heater (R), in particular an electric resistor, to heat and maintain the temperature of the hot liquid fluid contained therein,
a delivery line (112') of the preheating fluid from said second tank (111) to the die,
a return line (112") of the hot liquid fluid from the die to the second tank (111) through said three-way valve (EV5).

3. A system according to claim 2, wherein the delivery line (112') of the preheating hydraulic circuit (112), starting from the second tank (111) containing the hot liquid fluid, coincides at least partially with the delivery line of the primary hydraulic circuit (12), wherein the return line (112") of the preheating hydraulic circuit (112) coincides with the return line (12") of the primary hydraulic circuit (12) at least in the part between the die and the three-way solenoid valve (EV5), and wherein a pump is provided for the circulation of the hot liquid fluid in said preheating hydraulic circuit (112).

4. A system according to claim 3, wherein the pump for the circulation of the hot liquid fluid in the preheating hydraulic circuit (112) is the same recirculation pump (P1) for the circulation of the cooling fluid in the primary hydraulic circuit (12).

5. A system according to claim 3, wherein the pump for the circulation of the hot liquid fluid in the preheating hydraulic circuit (112) comprises a second pump (P2) which can be activated alternatively to the recirculation pump (P1).

6. A system according to claim 2, wherein the second tank (111) for the hot liquid fluid comprises a vent line (111') which is connected through a vent solenoid valve (EV6) to the return line (12") of the primary hydraulic circuit (12) downstream of the three-way solenoid valve (EV5), and a thermal probe (S3) to control the temperature of the hot liquid fluid in the same tank.

7. A system according to claim 2, wherein a metering valve is inserted on the return line (12") of the primary hydraulic circuit (12), upstream of the heat exchanger (SC) to guarantee a minimum cooling fluid passage, to maintain a desired pressure in the primary hydraulic circuit upstream of the valve itself, and to lower the pressure of said fluid from the side of its exit towards the open tank.

8. A system according to any claim 1, wherein the open tank (11) for the cooling fluid and the die are provided with thermal probes (S1; S2) and wherein the primary hydraulic circuit (12), the secondary pneumatic circuit (13) and the preheating hydraulic circuit (112) comprise solenoid valves, pressure switches and manometers to control fluids currently circulating.

* * * * *